United States Patent [19]

Foller et al.

[11] Patent Number: 4,995,553
[45] Date of Patent: Feb. 26, 1991

[54] THERMALLY CONTROLLED VALVE

[75] Inventors: Werner Foller, Stuhr; Holm Klann, Bremen, both of Fed. Rep. of Germany

[73] Assignee: GESTRA Aktiengesellschaft, Bremen, Fed. Rep. of Germany

[21] Appl. No.: 404,276

[22] Filed: Sep. 7, 1989

[30] Foreign Application Priority Data

Sep. 16, 1988 [DE] Fed. Rep. of Germany ....... 3831487

[51] Int. Cl.⁵ .......................... G05D 23/10; F16T 1/10
[52] U.S. Cl. ...................................... 236/48 R; 236/58
[58] Field of Search .......................... 236/48 R, 56, 58; 251/75

[56] References Cited

U.S. PATENT DOCUMENTS

| | | | |
|---|---|---|---|
| 1,321,395 | 11/1919 | Rustige et al. | 236/48 R |
| 1,781,287 | 11/1930 | Mayo | 236/48 R X |
| 2,690,875 | 10/1954 | Jenkins | 236/48 R |
| 2,739,454 | 3/1956 | Noaker | 236/48 R X |
| 3,004,712 | 10/1961 | Noakes | 236/48 R |
| 4,339,075 | 7/1982 | Schittek et al. | 236/48 R X |

OTHER PUBLICATIONS

Kurt Gieck "Collection of Technical Formulas" 1964
DIN 2092, Jun. 1978.

*Primary Examiner*—William E. Tapolcai
*Attorney, Agent, or Firm*—Collard, Roe & Galgano

[57] ABSTRACT

There is provided a thermally controlled valve having a valve seat, a closure valve associated therewith, an expansion capsule containing an evaporation medium which actuates the closure valve by a stroke displaceable wall part, and a snap spring biasing the closure in the opening direction and arranged so that in the closed position of the valve, the spring occupies a position of stroke lying in the range of stroke between the force maximum and the force minimum of its force stroke characteristic.

2 Claims, 3 Drawing Sheets

$t_1 > t_2 > t_3$

THERMALLY CONTROLLED VALVE

The present invention relates to a thermally controlled valve and, more particularly, it relates to a condensate drain valve.

Valves of the type with which the present invention is concerned (see German Patent No. 23 513, British Patent No. 473 063) open in accordance with the amount of medium to be drained. Where the amounts of medium accumulated are small, the closure valve assumes a throttling position. Experience has shown that such throttling positions many times, for example, in draining off condensate, result in heavy erosion through abrasion and, consequently, leakage at the valve seat and closure valve. This is particularly the case where small quantities are continuously accumulating.

The object of the present invention is to provide a thermally controlled valve of the type described above which is not subject to abrasion even where the quantities of medium to be drained are small.

The above object is accomplished in accordance with the present invention by providing a snap spring for operating the closure valve which is arranged such that in the closed position of the valve, the spring occupies a position of stroke lying in the range of stroke between the force maximum and the force minimum of its force-stroke characteristic. The opening force exerted by the snap spring on the closure valve decreases during the closing stroke from a wide-open position to the closed position of the closure valve. During the opening stroke the force increases from the closed position to a wide-open position. When the opening temperature is reached, the closure valve is consequently sprung into a wide-open position. Thus, the closure valve is sprung into a wide-open position which, for small amounts, exceeds the opening required for continuous elimination contemplated by the elastic expansion capsule. As a result, the small amount of medium is passed through in the shortest period of time. Subsequently, the valve again abruptly closes from the wide-open position. Because of the utilization of a snap spring instead of a conventional spring, i.e., a so-called crawl spring, throttle positions encouraging wear abrasion of the valve are avoided.

By the utilization of a monostable snap spring, i.e., a snap spring wherein no inversion of compressive force into traction force occurs over the spring stroke, particularly large, abrupt opening and closing strokes of the closure valve can be achieved with the same force maximum. Preferably, the snap spring is a cup spring which takes up especially little overall height. Also, such cup springs can be provided with radial spring tongues which form a crawl spring, thereby providing the closure valve with a very large stroke.

By positioning two closure valves in series with each other, wherein the downstream closure valve is, to a limited extent, relatively stroke displaceable with respect to the upstream closure valve, an abrupt, wide opening and closing results even where the smallest amounts of medium are involved. Thus, during the opening operation, as soon as a small amount of medium passes the first shut-off point of the valve, additional closing force is exerted in an intermediate chamber on the second closure valve and an additional opening force is thereby exerted on the first closure valve. The additional opening momentum results in the abrupt opening of the first closure valve, even in this position, into a wide-open position. In the process, the second closure valve, following the return of the relative stroke, is entrained out of its effectively sealing closed position into a wide open position.

In a further preferred embodiment, the flexible, stroke-displaceable wall part of the expansion capsule includes a diaphragm member and is supported in every stroke position by a monostable cup spring. The force resulting from the pressure differential between the interior and exterior of the expansion capsule ist absorbed by the cup spring. The relatively high tensile stresses which would otherwise occur in the diaphragm member, were the diaphragm member to absorb this force, do not result. The diaphragm member is merely subjected to the relatively insignificant flexural stresses engendered by the movement of the stroke. Despite its abrupt opening and closing movements, the valve according to the invention, whose diaphragm exhibits a long service life, is suited for a very broad range of applications. Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

Figure 1:
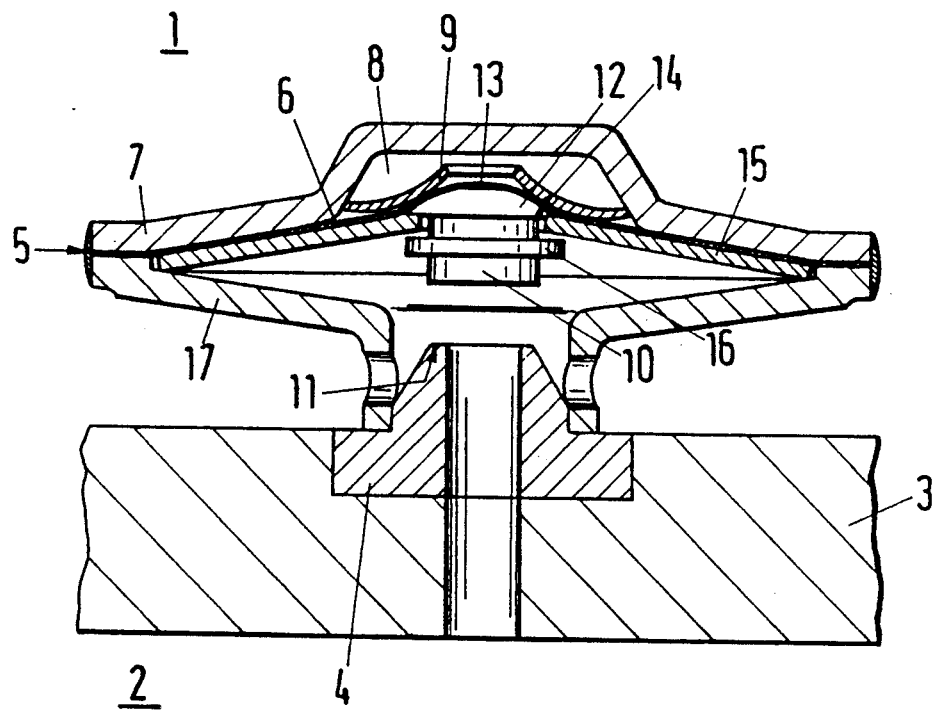
FIG. 1 is a cross-sectional view of the valve with expansion capsule according to the present invention in the open position.

Now turning to the drawings, there is shown in FIG. 1 a dividing wall 3 of a valve casing (not shown) which supports a seat element 4 between a high-pressure side 1 and a low-pressure side 2. On high-pressure side 1, that is, upstream of seat element 4, an expansion capsule 5 is arranged which exhibits a stroke displaceable wall part in the form of a flexible diaphragm member 6 and a stiff, cup-like wall part 7. Cup-like wall part 7 is vaulted for an evaporation medium centrally with respect to a receiving area 8. Receiving area 8 contains a fixedly positioned arresting disc 9 for diaphragm member 6 and via diaphragm member 6 for a closure valve 10 located upstream of a valve seat 11 provided on seat element 4. Closure valve 10 is provided with head 12. Diaphragm member 6 is provided with a central bearing depression 13 for receiving said head, whereby closure valve 10 is fastened to diaphragm member 6. At the height of depression rim, closure valve 10 exhibits an axial working surface 14 for a cup spring 15. Closure valve 10 also has an entraining cam 16 which faces the other side of cup spring 15. Cup spring 15 is configured as a bistable snap spring and bears with its outer edge on support disc 17. The latter, on the one hand, is fixedly connected to diaphragm member 6 and wall part 7, while, on the other hand, bearing on seat element 4.

Figure 3:
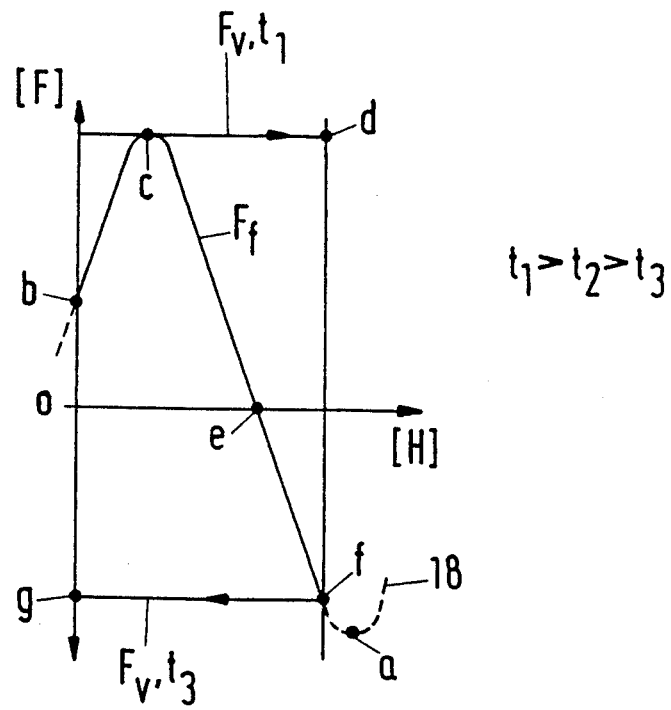
FIG. 3 is a force-stroke diagram of the valve of FIG. 1.

The opening and closing operation of the valve is shown in detail on the basis of the diagram in FIG. 3, Force $F_f$ of cup spring 15 and force $F_v$ exerted on closure valve 10 by the interior pressure of expansion capsule 5 and the pressure of the medium to be drained have been plotted on the ordinate. On the abscissa stroke H is plotted whereby the left line of demarcation designates the open end position of closure valve 10, and the right line of demarcation designates its closed position. The right line of demarcation lies in a distance to the force minimum "a" between the force maximum "c" and the force minimum "a" of force-stroke characteristic 18 of bistable cup spring 15. Force $F_v$ is essentially constant over the stroke.

In the cold state, the evaporation medium is condensed in receiving area 8, and its vapor pressure is equal to zero. Diaphragm member 6 and closure valve 10 are maintained in the open position by cup spring 15 and the pressure differential exerted in the open direction which prevails between receiving area 8 and high-pressure side 1.

If expansion capsule 5 is heated, evaporation takes place in receiving area 8, giving rise to a pressure corresponding to the vapor pressure curve of the evaporation medium. If force $F_v$ which results from such evaporation and from the pressure of the medium to be drawn off, and which force acts in the closing direction, exceeds force $F_f$ of cup spring 15, which acts in the opening direction, at point "b," closure valve 10 is moved, in an equilibrium of forces, in a constant manner in the closing direction. As soon as the force maximum "c" of characteristic 18 is reached in the process (temperature $t_1$), a disequilibrium between forces $F_f$ and $F_v$ occurs. The snap stroke range of cup spring 15 has been entered. Closure valve 10 moves abruptly out of and beyond the wide-open position until, creating a seal, it comes to rest in the closed position on valve seat 11—point "d." During the closing snap stroke, force $F_f$ of bistable cup spring 15 alters its operative direction at point "e." Cup spring 15 thereupon ceases to exert an opening effect via the working surface on closure valve 10, exerting, instead, a closing action on engaging cam 16.

In order for the valve to open, force $F_v$ must change its operative direction. For this to happen, a corresponding drop in temperature and, consequently, drop in pressure of the evaporation medium in receiving area 8 must occur. Following such a reversal of the operative direction diaphragm member 6 brings its share of force $F_v$ to bear in the opening direction in opposition to cup spring 15 on closure valve 10 fastened to diaphragm member 6. During cooling-down, closure valve 10 remains initially in the closed position until at temperature $t_3$, at point "f" an equilibrium of forces has been reached with cup spring 15. Because, at this point, that is to the left side displaced to the force minimum "a", the closing force $F_f$ of cup spring 15 exhibits a falling tendency, closure valve 10 is moved abruptly out of its closed position into the open position, i.e., point "g". During the opening snap stroke force $F_f$ of bistable cup spring 15 alters its operatice direction at point "e".

With an increase in temperature, closure valve 10 initially remains in the open position until an equilibrium is achieved between the forces $F_f$ and $F_v$, i.e., point "b". Closing thereupon ensues, as already previously set forth.

Thus, neither during the opening or closing operation does closure valve 10 assume a throttling position susceptible to wear.

Figure 2:
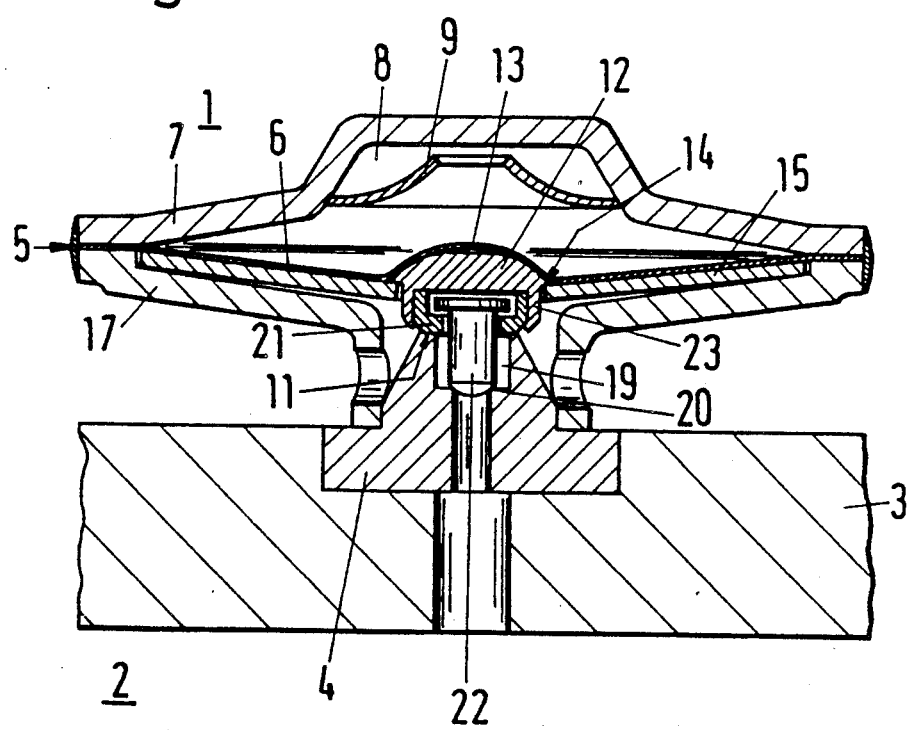
FIG. 2 is a cross-sectional view of a second embodiment of the valve according to the present invention with the expansion capsule in the closed position.
Figure 4:
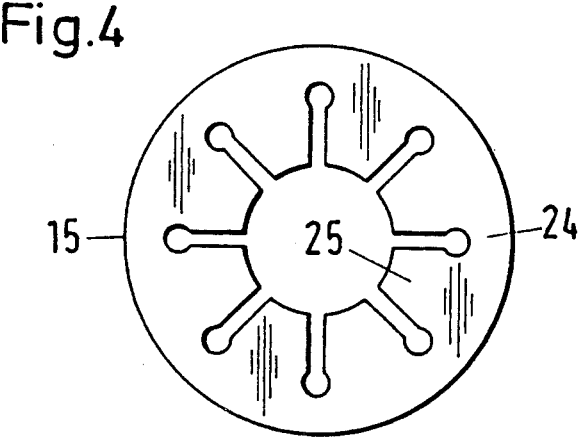
FIG. 4 is a top plan view of the cup spring of FIG. 2.

In the embodiment shown in FIG. 2, an intermediate chamber 19 is located downstream of valve seat 11 and is provided with an exhaust through valve seat 20. A first, ring-shaped closure valve 21 interacts with a first valve seat 11. A second closure valve 22 arranged in intermediate chamber 19 interacts with second valve seat 20. Second closure valve 22 is coupled to the first closure valve and, to a limited degree, is relatively stroke-displaceable with respect thereto. First closure valve 21 is tightly secured inside a closure valve carrier 23 which displays head 12 centrally supported in bearing depression 13 of diaphragm member 6 and working surface 14 for the cup spring 15. A form-locking (shape-fitting) connection between diaphragm member 6 and head 12 was dispensed with. Cup spring 15 exhibits, as FIG. 4 shows, a closed, ring-shaped area 24 from which spring tongues 25, in stroke-cumulative manner, extend inwardly in radial fashion. Area 24 is configured as a monostable snap spring, while spring tongues 25 function like crawl springs. Cup spring 15 bears on the frontal area of diaphragm member 6 on the closure valve side.

Figure 5:
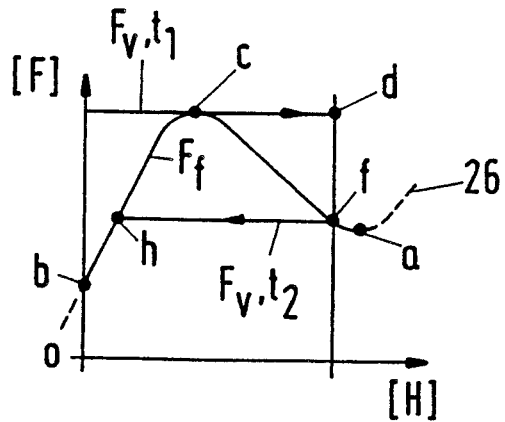
FIG. 5 is a force-stroke diagram of the valve of FIG. 2.

Both successive shut-off points 11, 21 and 20, 22 in the direction of flow close and open in delayed manner one after the other as a function of the relative stroke of both closure valves 21 and 22. In the diagram of FIG. 5 which, among other things, depicts the force-stroke characteristic 26 of monostable cup spring 15, the left line of demarcation denotes the open end position and the right line of demarcation denotes the closed position of closure valve 22. This is shaped in such a way that the closing force exerted thereon by the pressure of the medium is less than the force differential between both extremes "a" and "c" of characteristic 26.

The closing movement from the open end position, point "b", occurs in a constant manner in the valve according to FIG. 2 when the temperature rises to the force maximum "c" of the characteristic 26. At point "c", both closure valves 21 and 22 occupy a wide-open position. From there (temperature $t_1$) the closing movement progresses in a snapping manner. During the snap stroke, closure valve 22 initially comes to bear on its valve seat 20, forming a seal, point "d". Meanwhile, closure valve 21 continues its snap stroke until it has assumed its closed position on valve seat 11.

If the closed position of closure valve 21 lies on the right side of force minimum "a" of the characteristic 26, when the temperature drops there first occurs a crawling opening movement of closure valve 21 up to a force minimum "a" (temperature $t_2$). From this point, the opening movement continues abruptly into a wide-open position. During this abrupt movement, upon conclusion of the relative stroke, closure valve 22 is abruptly entrained out of the tightly closed position, point "f", into a wide-open position, point "h".

If the closed position of closure valve 21 is within or on the left side of force minimum "a" of characteristic 26, the crawling portion of the opening movement of closure valve 21 does not occur. Said opening movement occurs, instead, in a snapping manner from the very outset.

The combination of the snapping, monostable cup spring 15 with the two closure valves 21 and 22 offers the distinct advantage that closure valve 22 springs form the wide-open position into the fully sealing closed position and vice-versa. Furthermore, a large flow section is already freed between valve seat 11 and closure valve 21 during the opening operation before closure valve 22 releases the passage of medium. Erosion wear at the shut-off points 11, 21 and 20, 22 is thereby substantially eliminated.

The abrupt opening and closing always occurs independent of the quantity of the medium to be drained off, even where the smallest quantities are involved. On the one hand, it is initiated through pressure changes in intermediate chamber 19. On the other hand, it is forcibly and particularly characteristically actuated by cup spring 15.

During the stroke movements, monostable cup spring 15 bears not only on working surface 14 of closure valve carrier 14, but also on the frontal area of diaphragm member 6 on the closure valve side. During the entire stroke, therefore, diaphragm member 6 is supported over a large area by cup spring 15. The force resulting from the differential pressure between receiving area 8 and high-pressure side 1 consequently is absorbed by cup spring 15. Diaphragm member 6 is not stressed by this force; it is, rather, merely subjected to the relatively slight flexural stresses arising from the movement of stroke. As a result, diaphragm member 6 can be utilized under conditions of very high pressure differentials and, despite the abrupt movements of stroke, it also exhibits a very long service life.

In the valves according to the invention, the diaphragm member can consist of a single diaphragm or of a plurality of diaphragm lamellas disposed on top of the other. Diaphragm lamellas provide a particularly high flexibility of the diaphragm member. The diaphragm or diaphragm lamellas can, moreover, be either smooth surfaced in construction or provided with concentric waves. The waves absorb the radial dimensional fluctuations generated during the stroke without deformation of the diaphragm member.

Figure 6:
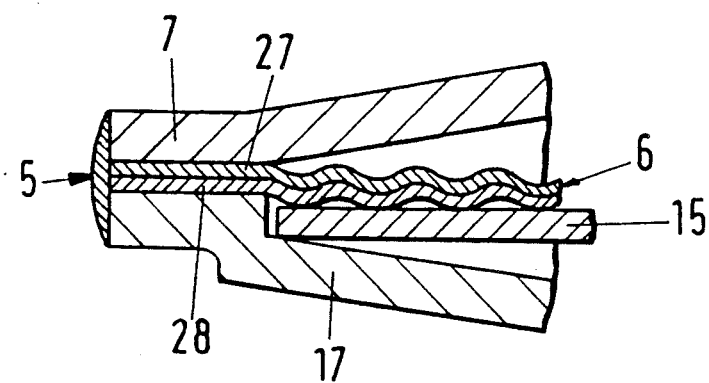
FIG. 6 is an enlarged detailed view of the expansion capsule of FIGS. 1 and 2 in a partially open position.

In the preferred embodiment contemplated in both practical embodiments and shown in FIG. 6, diaphragm member 6 consists of two diaphragm lamellas 27 and 28 with concentric waves. In the pre-vaulted state, specifically, in the open end position, diaphragm member 6 is clamped between wall part 7 and supporting disc 17 and welded to both. This prevents tensile stresses in diaphragm member 6.

While only two embodiments of the present invention have been shown and described, it will be obvious that many changes and modifications may be made thereto without departing from the sphere and scope of the invention.

What is claimed is:

1. A thermally controlled valve, in particular, a condensate drain valve, comprising
   a valve seat, a first closure valve associated with said valve seat, an expansion capsule containing an evaporation medium which actuates the closure valve by means of a stroke-displaceable wall part, a spring biasing said closure valve in the opening direction,
   said spring being a monostable snap spring, and said monostable snap spring is arranged in such a way that in the closed position of the valve, it occupies a position of stroke lying distant to the force minimum of its force-stroke-characteristic;
   said expansion capsule is arranged upstream of said valve seat;
   an intermediate chamber is arranged downstream of said valve seat having a second valve seat at a discharge therefrom;
   a second closure valve is provided in said intermediate chamber which interacts with said second valve seat; and
   coupling means coupling said first and second closure valves so that said second closure valve is, to a limited degree, relatively stroke-displaceable with respect to said first closure valve.

2. A thermally controlled valve, in particular, a condensate drain valve, comprising:
   a valve seat;
   a closure valve associated with said valve seat;
   an expansion capsule containing an evaporation medium which actuates the closure valve by means of a stroke-displaceable wall part;
   a cup spring biasing said closure valve in the opening direction;
   said cup spring being a snap spring arranged so that in the closed position of the valve, it occupies a position of stroke lying in the range of stroke between the force maximum and the force minimum of its force-stroke characteristic;
   said stroke-displaceable wall part of said expansion capsule including a diaphragm bearing said closure valve;
   said cup spring resting in direct contact with and against the frontal area of said diaphragm component which is on the closure valve side; and
   said diaphragm being in direct contact with and supported over a large area by said cup spring.

* * * * *